US010451504B2

(12) United States Patent
Campbell et al.

(10) Patent No.: US 10,451,504 B2
(45) Date of Patent: Oct. 22, 2019

(54) INTELLIGENT FIBER ROPE TERMINATION

(71) Applicants: Richard V. Campbell, Havana, FL (US); Samuel Bull, Havana, FL (US)

(72) Inventors: Richard V. Campbell, Havana, FL (US); Samuel Bull, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 121 days.

(21) Appl. No.: 15/445,306

(22) Filed: Feb. 28, 2017

(65) Prior Publication Data
US 2017/0299450 A1    Oct. 19, 2017

Related U.S. Application Data

(60) Provisional application No. 62/300,948, filed on Feb. 29, 2016.

(51) Int. Cl.
*G01L 5/04* (2006.01)
*G01C 19/66* (2006.01)
*G01L 5/10* (2006.01)

(52) U.S. Cl.
CPC ............. *G01L 5/04* (2013.01); *G01C 19/661* (2013.01); *G01L 5/103* (2013.01)

(58) Field of Classification Search
CPC ......... G01L 5/04; G01C 19/661; G01C 19/66; G01N 2203/0016
See application file for complete search history.

(56) References Cited

U.S. PATENT DOCUMENTS

| 7,478,563 | B2 * | 1/2009 | Weisman | G01L 5/042 |
| | | | | 73/786 |
| 8,371,015 | B2 * | 2/2013 | Campbell | F16G 11/042 |
| | | | | 29/525.01 |
| 9,389,130 | B2 * | 7/2016 | Teurlay | G01L 5/04 |
| 9,791,337 | B2 * | 10/2017 | Campbell | D07B 1/185 |
| 9,835,228 | B2 * | 12/2017 | Campbell | F16B 39/20 |
| 10,054,505 | B2 * | 8/2018 | Campbell | D07B 1/185 |

(Continued)

OTHER PUBLICATIONS

Howe et al., "Moorings for Ocean Observatories: Continuous and Adaptive Sampling", Jul. 22, 2006, Presented at the 2006 Fourth International Workshop on Scientific Use of Submarine Cables and Related Technologies, Dublin, Ireland, pp. 1-10.*

*Primary Examiner* — Freddie Kirkland, III
(74) *Attorney, Agent, or Firm* — J. Wiley Horton

(57) ABSTRACT

A cable termination including an integral instrument package providing intelligence. The instrument package may assume many forms and may serve many purposes. In a preferred embodiment, the termination includes a position-determining system and an on-board processor. The processor determines a current location in space for the termination based on the information it is receiving. This positional information may then be transmitted to an external receiver. In the scenario where the termination is attached to a payload, the positional information may be used by an external positioning device (such as a crane) to control the motion of the termination and thereby place the payload in a desired position. The termination also preferably includes load-monitoring and recording features. The termination may also carry one or more ROV's/AUV's.

20 Claims, 17 Drawing Sheets

(56) References Cited

U.S. PATENT DOCUMENTS

2014/0137388 A1* 5/2014 Campbell ............. F16G 11/025
  29/461
2015/0259044 A1* 9/2015 Amate Lopez ....... B63B 21/502
  114/265

* cited by examiner

INTELLIGENT FIBER ROPE TERMINATION

CROSS-REFERENCES TO RELATED APPLICATIONS

This non-provisional patent application claims the benefit pursuant to 37 C.F.R. 1.53(C) of provisional patent application Ser. No. 62/300,948. The provisional application was filed on Feb. 29, 2016. It listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a rope or cable termination that includes an instrument package useful for things such as position monitoring and load monitoring, as well as other components that are connected to the instrument package.

2. Description of the Related Art

In this disclosure the terms "rope" and "cable" are used interchangeably. Both are examples of a "tensile strength member," meaning a component that readily transmits tensile forces but not compressive forces. Tensile strength members must generally be connected to other components in order to be useful. A flexible cable provides a good example. Most cables include some type of end-fitting configured to transmit a load. For example, a cable used in a hoist generally includes a lifting hook on its free end. This lifting hook may be rigged to a load. The assembly of an end-fitting and the portion of the cable to which it is attached is commonly called a "termination." Most high-strength cables are presently made of steel. The cable is a wound or braided assembly of individual steel wire. An end fitting (such as a lifting hook) is often attached to the steel cable by placing a length of the cable within a cavity running through a portion of the end fitting. The wires within the end fitting are splayed apart and a potting compound is then used to lock the wires within the fitting. The term "potting compound" means any substance which transitions from a liquid to a solid over time. Examples include molten lead, thermoplastics, and UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

Molten lead was traditionally used as a potting compound for steel cables. Once the individual wires were splayed within the expanding cavity of an end-fitting, molten lead was poured into the cavity. The lead then solidified and locked a portion of the cable in the cavity. In more recent years lead has been replaced by high-strength epoxies.

Modern cables may still be made of steel, but high-strength synthetic filaments are becoming more common. These include DYNEEMA, SPECTRA, TECHNORA, TWARON, KEVLAR, VECTRAN, PBO, carbon fiber, and glass fiber (among many others). Modern cables may also be made of older, lower-strength synthetic materials such as NYLON. In the case of high-strength synthetics, the individual filaments have a thickness that is less than that of human hair. The filaments are very strong in tension, but they are not very rigid. They also tend to have low surface friction. These facts make such synthetic filaments difficult to handle during the process of adding a termination and difficult to organize. Hybrid cable designs are also emerging in which traditional materials are combined with high-strength synthetic materials. These present additional challenges, since the metal portions may be quite stiff while the synthetic portions will not be.

Those skilled in the art will know that cables made from synthetic filaments have a wide variety of constructions. In many cases a protective jacket will be provided over the exterior of the synthetic filament. This jacket does not carry any significant tensile load and it may therefore be made of a different material.

Most larger cables are made as an organized grouping of smaller cables. The smaller cables are often referred to as "strands." One example is a parallel core of synthetic filaments surrounded by a jacket of braided filaments. In other cases the cable may be braided throughout. In still other examples the cable construction may be: (1) an entirely parallel construction enclosed in a jacket made of different material, (2) a helical "twist" construction, (3) a more complex construction of multiple helices, multiple braids, or some combination of helices and braids, or (4) a hybrid construction including metallic constituents.

The reader is referred to commonly-owned U.S. Pat. No. 8,371,015 for more detailed descriptions regarding the application of an attachment to a sub-component of a larger cable. The '015 patent explains how individual anchors can be attached to the strands and the anchors can then be attached to a common collector to create a uniform load-bearing structure.

The present invention is not limited to multi-stranded terminations. Any form of cable termination may be used, such as a single socket for example. The exemplary embodiments depicted all include multi-stranded terminations but this fact should not be viewed as limiting. The embodiments also pertain to the specific field of deep water lifting and lowering. The invention is by no means limited to this field, however. Finally, the termination types depicted are most suitable for high-strength synthetic fibers. The present invention may be applied to many different cable types and is not limited to such fibers.

BRIEF SUMMARY OF THE PRESENT INVENTION

The present invention comprises a cable termination including an integral instrument package. The instrument package may assume many forms and may serve many purposes. In a preferred embodiment, the termination package includes a position-determining system and an on-board processor. The processor determines a current location in space for the termination based on the information it is receiving. This positional information may then be transmitted to an external receiver. In the scenario where the termination is attached to a payload, the positional information may be used by an external positioning device (such as a crane) to control the motion of the termination and thereby place the payload in a desired position with improved accuracy. Such an instrument package may also be used to aid the automation of various lifting processes.

The termination also preferably includes load-monitoring and recording features. These features act as a "black box" for the termination, monitoring its performance and reporting (in real-time or at a later time) any exceedances or any deterioration in performance or structural integrity.

REFERENCE NUMERALS IN THE DRAWINGS

- 10 cable
- 12 strand
- 18 anchor
- 20 cavity
- 22 potted region
- 24 loading stud
- 26 male thread
- 28 threaded engagement
- 30 strand termination
- 34 collector
- 38 receiver
- 40 nut
- 44 hemi bearing
- 46 opening
- 48 through hole
- 50 central opening
- 64 middle strand collector
- 66 distal strand collector
- 68 load cell
- 70 jacket
- 72 core
- 74 housing
- 76 clevis structure
- 78 transverse hole
- 80 bolt
- 82 receiver
- 84 recess
- 86 cavity
- 88 first instrument package
- 90 second instrument package
- 92 connection
- 94 core termination
- 96 battery
- 98 power supply
- 100 inertial measurement system
- 102 processor
- 104 memory
- 106 external power connector
- 108 external data connector
- 110 acoustic antenna
- 112 acoustic transducer
- 114 I/O port
- 116 I/O port
- 118 I/O port
- 120 load cell
- 122 load cell
- 124 load cell
- 126 I/O port
- 128 pressure sensor
- 130 temperature sensor
- 132 intelligent cable termination
- 134 thruster controller
- 136 salinity
- 138 extended housing
- 140 thruster
- 142 trunnion mount
- 144 sensing/comm element
- 146 sensor
- 148 sensor lead
- 150 sensor lead
- 160 potting surface
- 162 payload
- 164 lifting tang
- 166 connector
- 168 cable
- 170 camera
- 172 ROV garage
- 174 ROV
- 176 ROV garage
- 178 ROV
- 180 tether
- 182 connector
- 184 cable
- 186 connector
- 188 tang
- 190 sling
- 192 release mechanism
- 194 pallet
- 196 leg

DETAILED DESCRIPTION OF THE INVENTION

Figure 1:
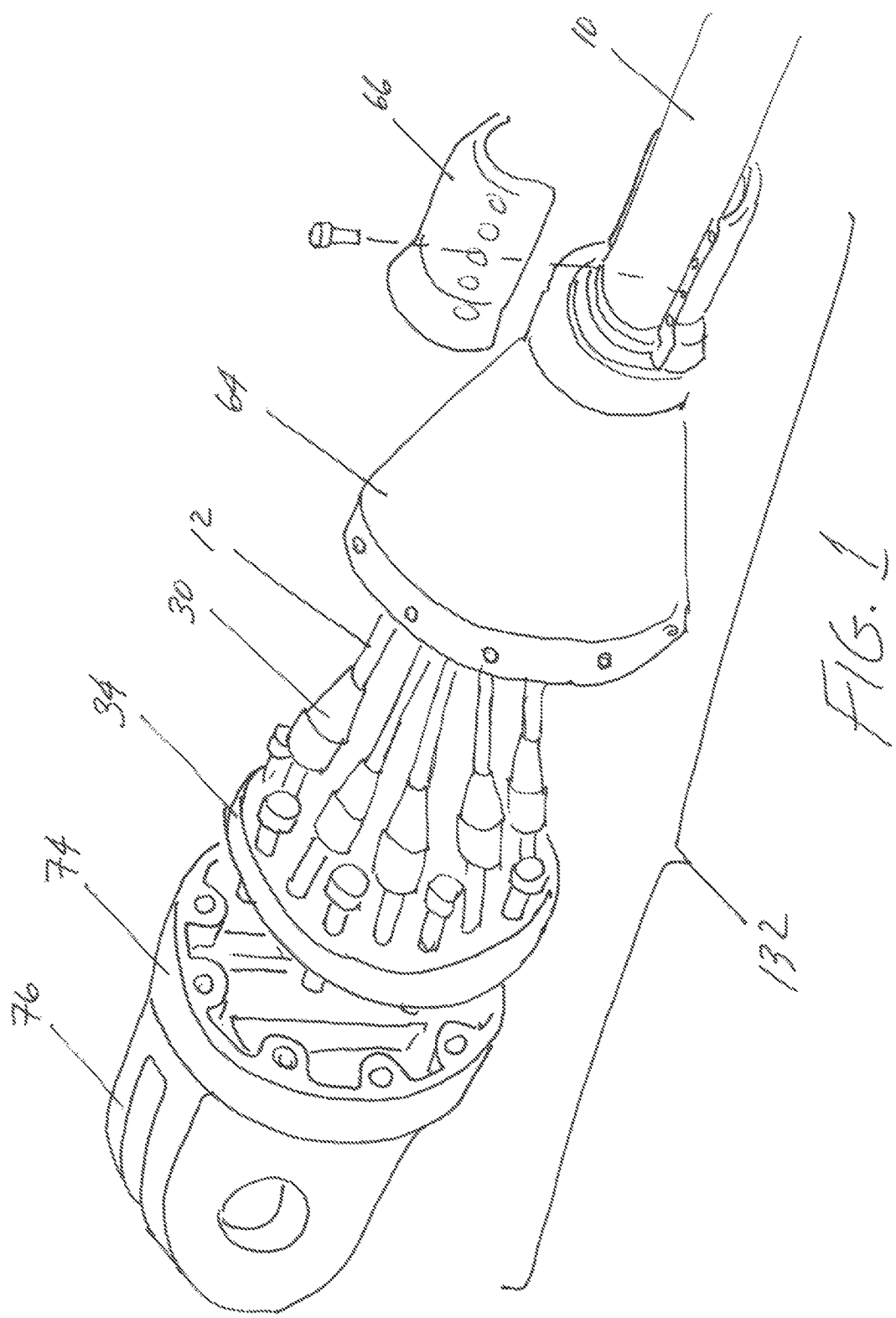
FIG. 1 is an exploded perspective view, showing an exemplary intelligent anchor made according to the present invention.

FIG. 1 provides an exploded view of an intelligent cable termination 132, such as may be used to create an embodiment of the present invention. The particular cable 10 shown has nine individual strands 12 surrounding a core. All these components are encompassed within a surrounding jacket. A portion of the jacket is removed to reveal the individual strands and the core. A strand termination 30 is affixed to the end of each individual strand 12. Each strand termination 30 is then attached to collector 34.

The intelligent cable termination 132 is configured to attach to an external element (such as a payload to be hoisted and placed by a crane). A connecting feature can be added to collector 34. However, in the version shown, the connecting feature (clevis structure 76) is incorporated as part of housing 74. Housing 74 connects to collector 34. Using this approach, tension carried by strands 12 is transmitted to the collector, then to housing 74 and finally through clevis structure 76 to an external element.

In addition to carrying the cable's load, housing 74 in this embodiment provides additional internal space for housing an instrument package or packages. The instrument package or packages allows the integrated termination to become an "intelligent" termination, as will be described subsequently.

Middle strand collector 64 slides over the splayed strands and attaches to the perimeter of collector 34. Distal strand collector 66 (which is split into two halves in this version), clamps over the small end of the middle strand collector and seals the interface between the middle strand collector and the jacketed portion of the cable.

Figure 2:
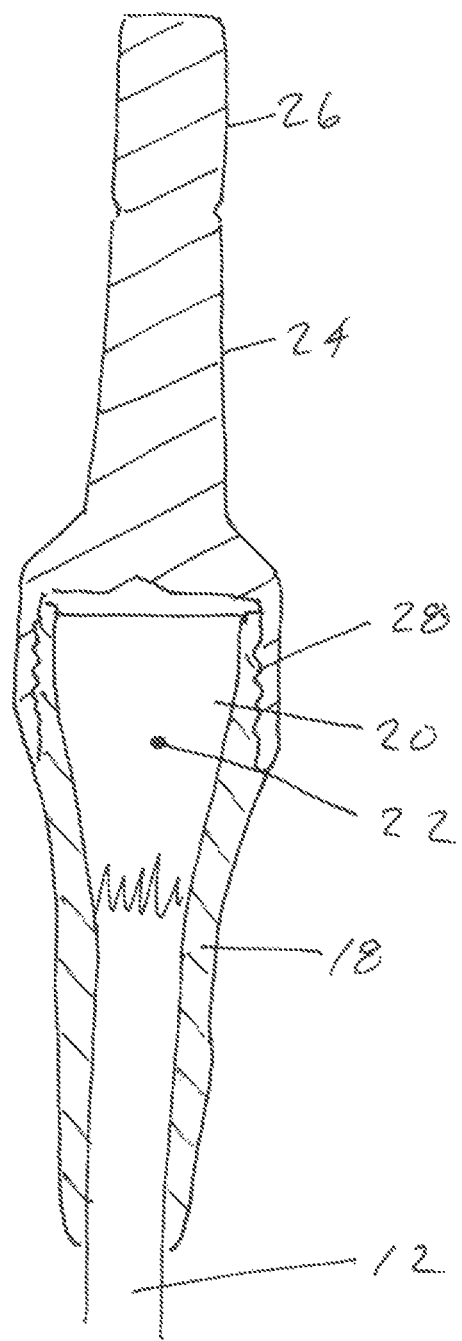
FIG. 2 is a sectional elevation view, showing one type of strand termination that may be used.

FIG. 2 is a sectional elevation view showing an exemplary structure for a strand termination 30. The individual filaments within strand 12 (which may be a million filaments or more in the case of an advanced synthetic material) are connected to anchor 18, such as by potting a length of the filaments within cavity 20 to form potted region 22. Loading stud 28 is connected to anchor 18 via threaded engagement 28. The loading stud is equipped with a suitable force-transferring feature—in this case male thread 26. This assembly thereby transmits tensile loads from strand 12 to loading stud 24.

Figure 3:
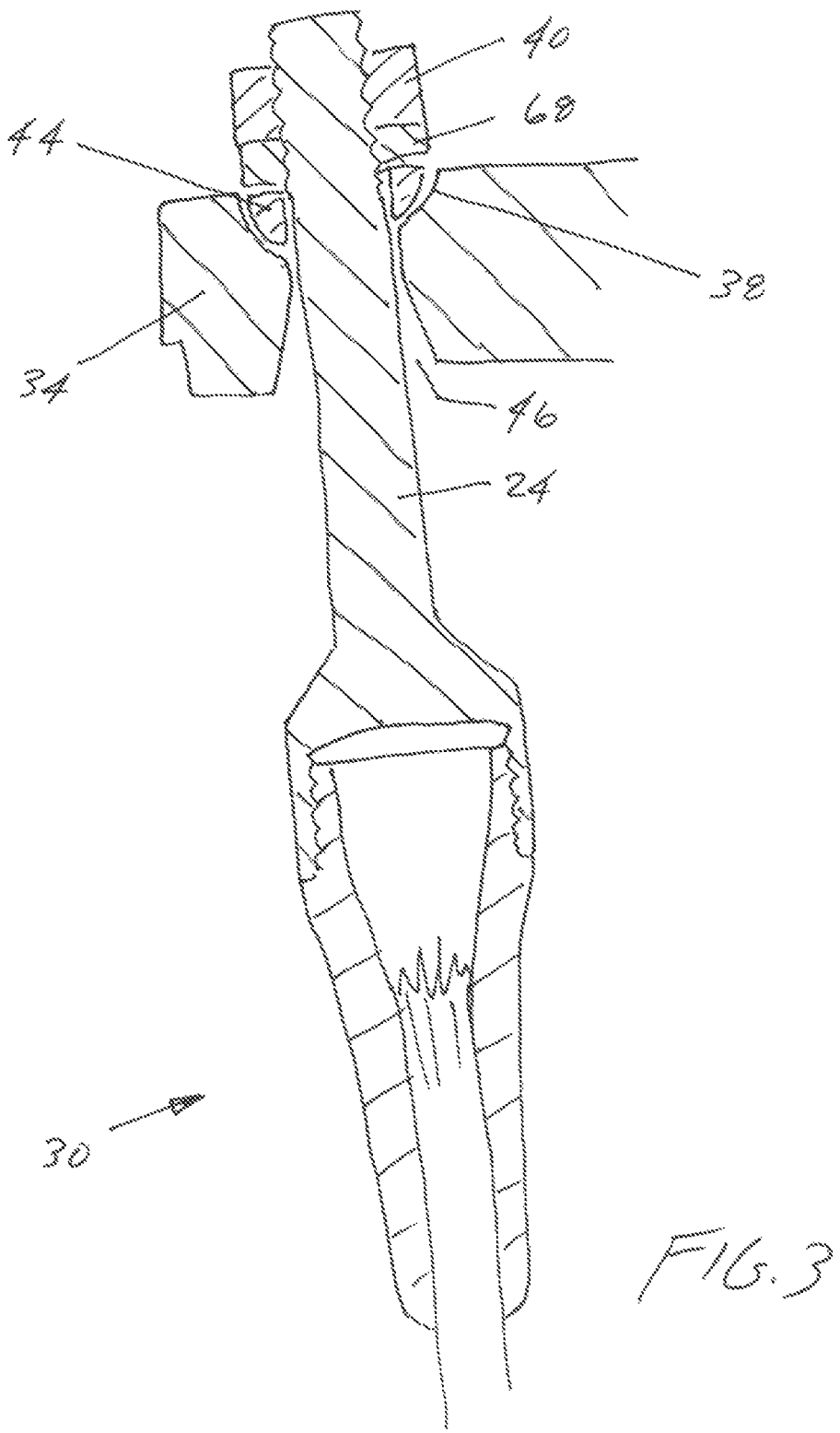
FIG. 3 is a sectional elevation view, showing representative instrumentation that may be added to a strand termination.

FIG. 3 is a sectional elevation view depicting an exemplary connection between strand termination 30 and collector 34. In this version a ball-and-socket connection is used. Opening 46 passes through collector 34 at an angle. A hemispherical receiver 38 is provided in the portion of the opening opposite the strand. Hemi bearing 44 rests in receiver 38. Loading stud 24 passes through hemi bearing 44. Load cell 68 is placed on top of hemi bearing 44. Nut 40 secures the assembly in place. Each individual strand termination includes its own adjusting nut. The nuts may be used to individually allocate the total tension among the strands. Load cell 68 provides an electrical output that corresponds to the amount of compressive load it is presently experiencing. Each individual strand termination is preferably provided with a load cell so that the load on each strand can be monitored.

The load cell shown in this version is illustrative of any load/stress/strain sensing device that is incorporated into a cable or strand's load path. Other types of devices may be substituted. As an additional example, a pressure sensing device can be provided within the potted region inside the anchor. As still another example, a strain gauge may be attached to the exterior surface of the strand termination.

Figure 4:
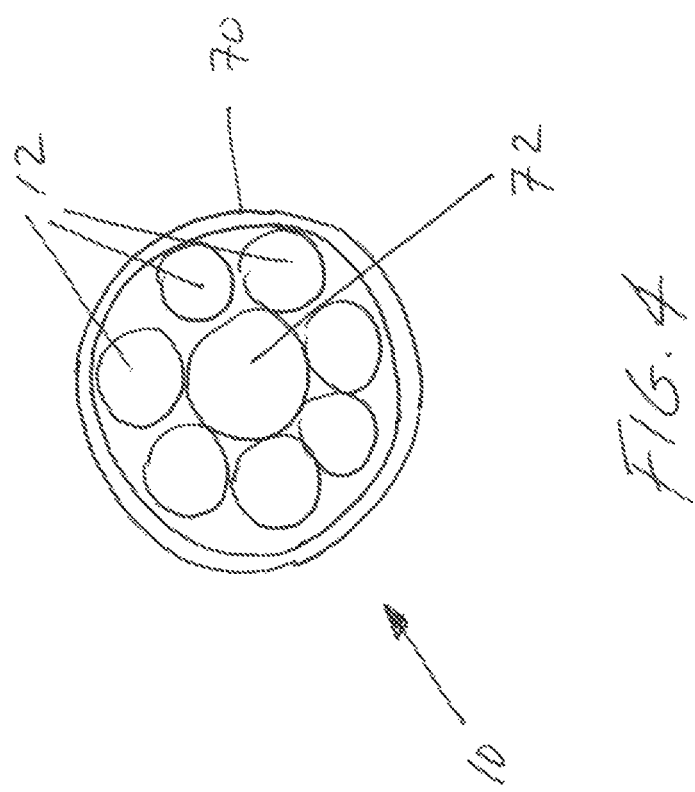
FIG. 4 is a sectional view, showing one possible construction for a multi-stranded cable.

FIG. 4 shows a cross sectional view through an exemplary cable assembly of the type depicted in FIG. 1. This particular cable has ten sub-groupings—core 72 surrounded by nine strands 12. Optional Jacket 70 may be provided to surround and protect the other components. While cable jackets are not common in the field of deep water lowering and lifting (primarily due to inspection limitations), with the addition of sensory technologies, an external jacket may be an advantageous feature.

Figure 5:
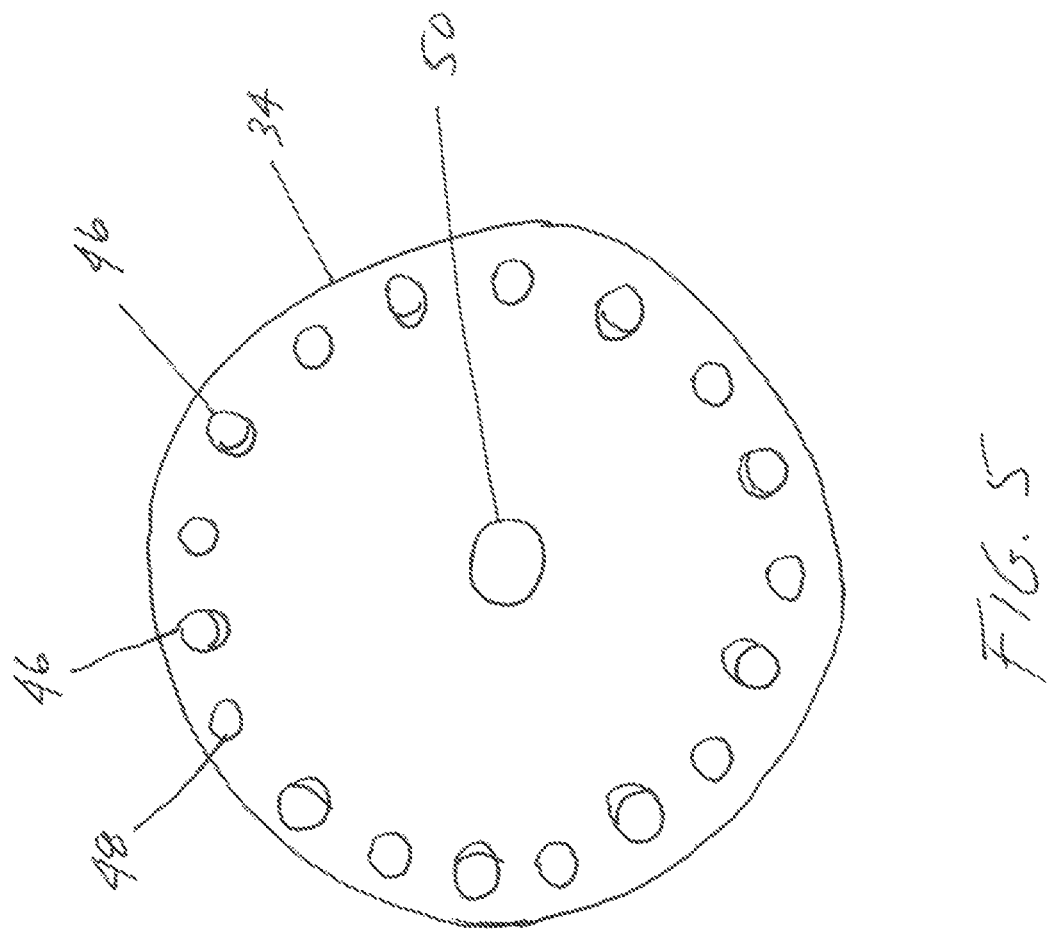
FIG. 5 is a plan view, showing a collector.

FIG. 5 depicts a plan view of collector 34 (the same version as shown in FIG. 1). Center opening 50 receives core 72. Nine openings 46 are provided for the nine strands 12. Nine through holes 48 are provided for bolts that are used to attach the collector to the housing.

Figure 6:
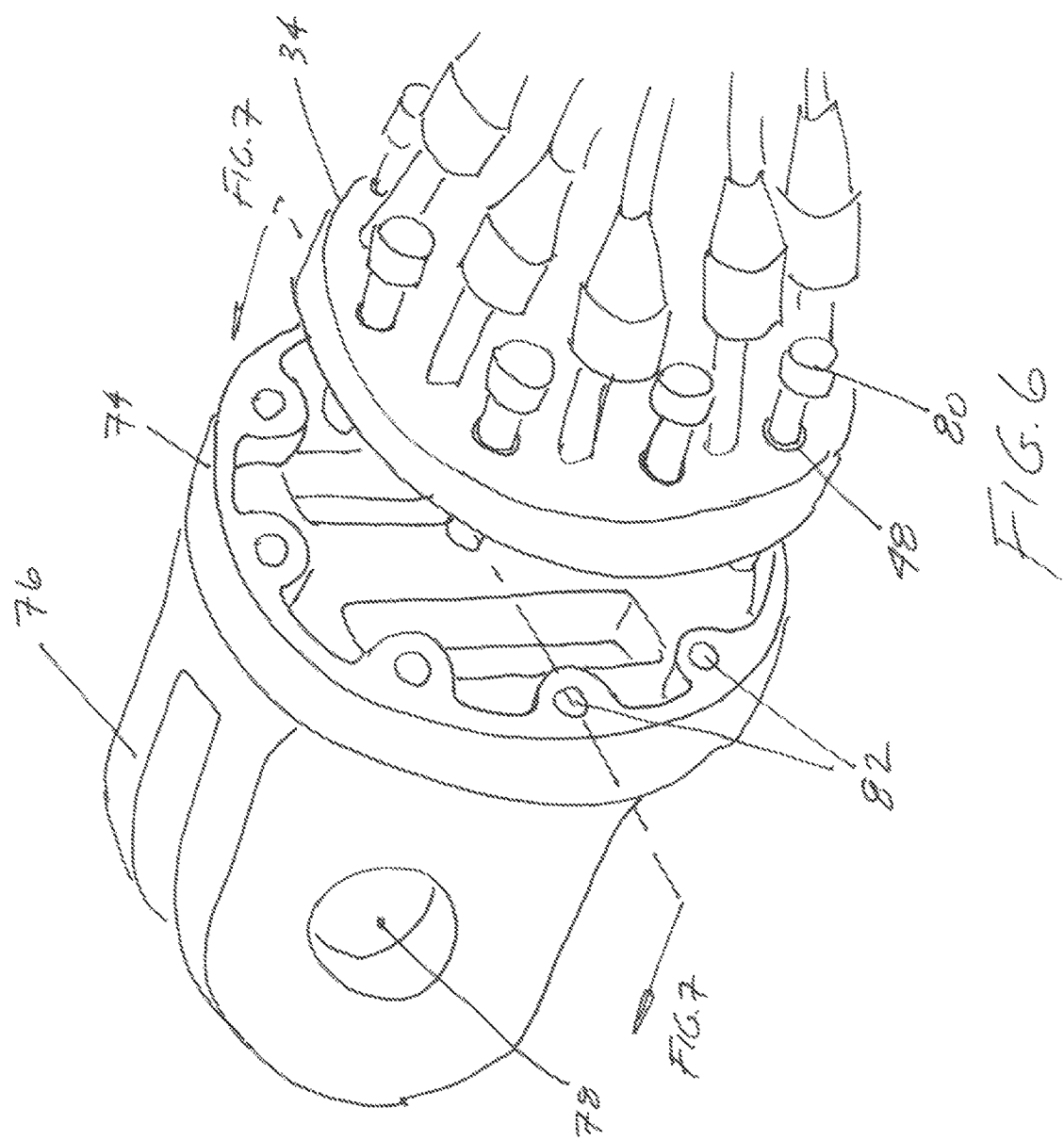
FIG. 6 is an exploded perspective view, showing additional features of the housing and collector.

FIG. 6 provides a perspective view of collector 34 and housing 74. The reader will note how the nine through holes 48 in the collector align with nine receivers 82 in housing 74. Each receiver 82 includes a female thread. Nine bolts 80 are passed through the receiver and into the nine threaded receivers 82 in the housing. The bolts are then tightened to secure the collector to housing 74.

In this example housing 74 is machined as one integral piece. It includes clevis structure 76 with transverse hole 78. This is configured to receive a tang and cross-pin in order to attach the housing to some external element. An example of an external element would be a payload that is to be lifted and moved using the inventive cable termination. In many cases additional rigging (such as lifting slings) and hardware will be added to the clevis structure shown. Thus, the clevis structure should be viewed as exemplary and non-limiting.

Figure 7:
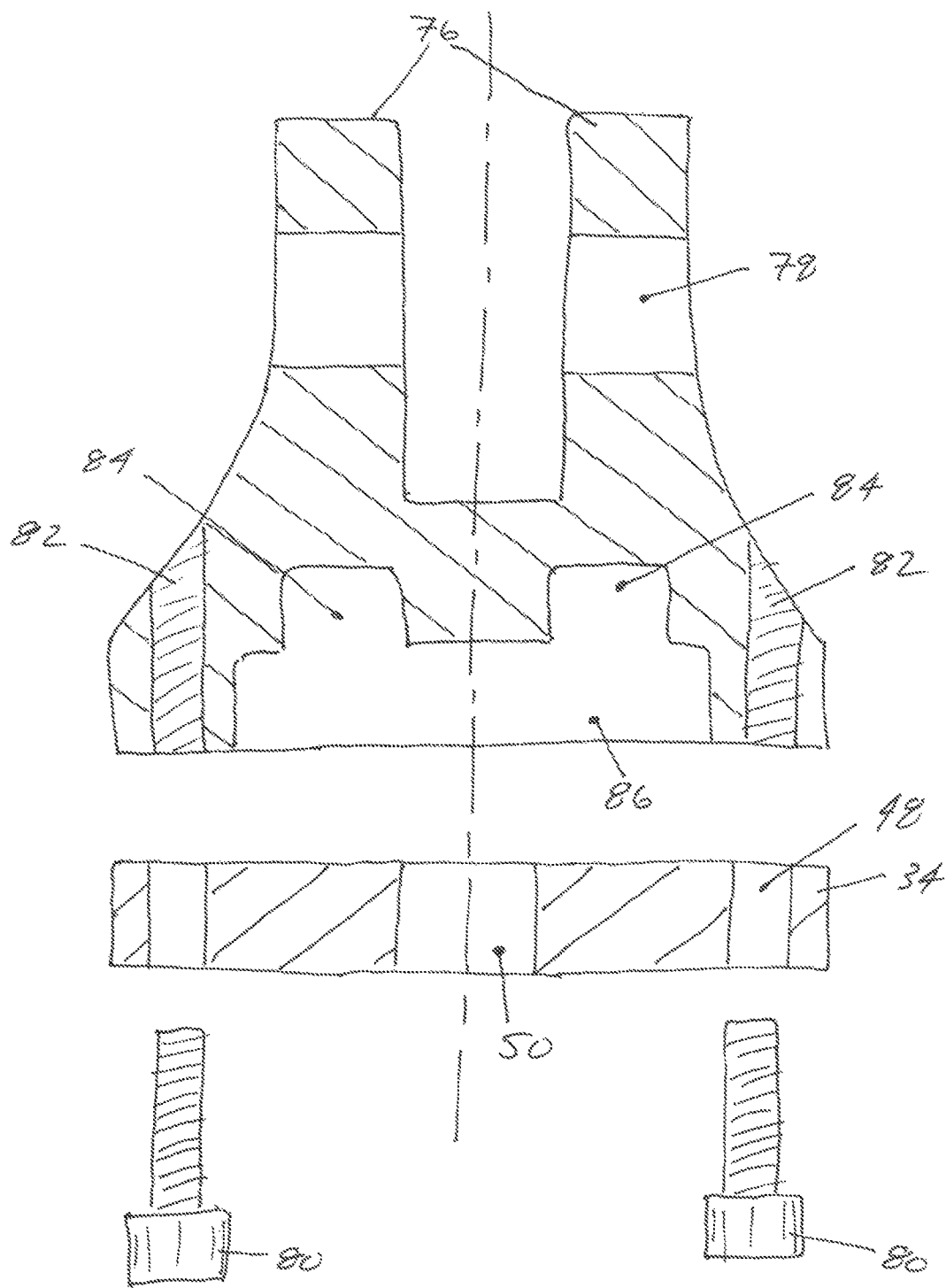
FIG. 7 is a sectional elevation view, showing a version in which a separate collector and housing is used.

Housing 74 includes an internal recess 84 that may be used to house one or more instrumentation packages. FIG. 7 shows a sectional elevation view through collector 34 and housing 74. Cavity 86 is provided in the portion of the housing that faces the collector. One or more additional recesses may be provided where the limitations of structural strength requirements permit. In the example shown, two such recesses 84 are provided.

It is preferable to provide space for instrumentation within the integrated termination itself. However, any available region around the integrated termination could be employed as space for instrumentation—provided that it is sufficiently protected. The protective body for the instrumentation need not be the same body that is used for the integrated termination. Housing 74 is preferably quite robust, and in some cases may be sealed from water and/or water pressure. Given that most instruments are sensitive to water and/or the pressures of deep water operation, a boundary will typically need to be established. This can either be done within housing 74 as an example, or individually between instrument package components. For example the power source and sensors may have independently sealed packages for this purpose. Housing 74 would then not require an overall seal.

Figure 8:
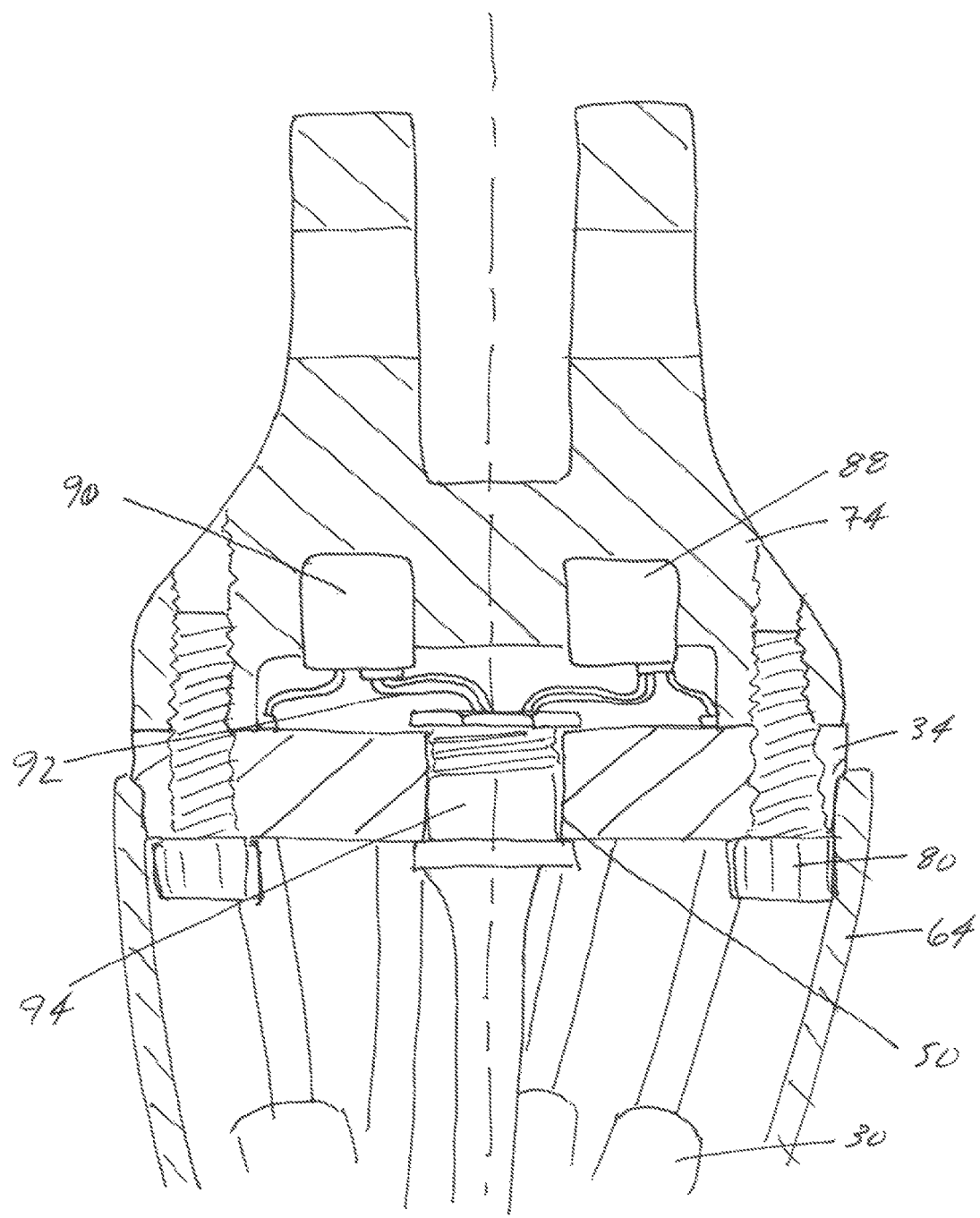
FIG. 8 is a sectional elevation view, showing a completed assembly using the components of FIG. 7.

The user will note in FIG. 7 how bolts 80 may be placed in through holes 48 and threaded into receivers 82. FIG. 8 shows a sectional view through an assembly made according to the present invention (The section is taken on the same plane used for FIG. 7). Core termination 94 is provided on the end of core 72 in this example. It is secured within central opening 50 in collector 34. In this version core 72 is not intended to carry significant tension. It houses communication and/or power lines that extend along the entire length, or in some cases a portion, of the cable.

First instrument package 88 and second instrument package 90 are contained within housing 74. These instrument packages are connected to the elements in core 72 (such as fiber optic lines and electrical conductors). The instrument packages are also connected (in this version) to the load cells monitoring the load on each individual strand. As will be known to those working in the field of deep water lifting, the addition of power, communication, data, air, fluid, or any form of auxiliary service line can be incorporated with the strength member to increase the service context of the intelligent termination. These service lines can be incorporated in countless configurations, such as inside strands, between strands, within layers of the jacket, temporarily wrapped and unwrapped around the outside of the cable, etc. The proposed invention is not limited to any specific cable design. However, the addition of auxiliary service lines can significantly increase the advantages of the inventive termination.

As an example of the above, the addition of fiber optics and in some cases power within the lifting cable may allow high speed data transfer for real-time feedback of position, or operation of subsea ROVs and/or AUVs. In such cases, the intelligent termination can more easily become the power and/or communication hub for additional machines and/or devices operating at depth.

The reader will also note in the example of FIG. 8 that middle strand collector 64 has been attached to the outer perimeter of collector 34. The unification of these elements (see FIG. 1—housing, collector, middle strand collector, distal strand collector, and cable) creates a solid and protective assembly. As shown in FIG. 8, the instrument packages and associated connections are well-protected inside a very solid surrounding structure. This configuration is preferable, as a cable termination frequently lives in a hostile environment. As covered previously, this housing may take on many shapes and forms, including separate or attached housings that may not be within the termination casing.

Figure 9:
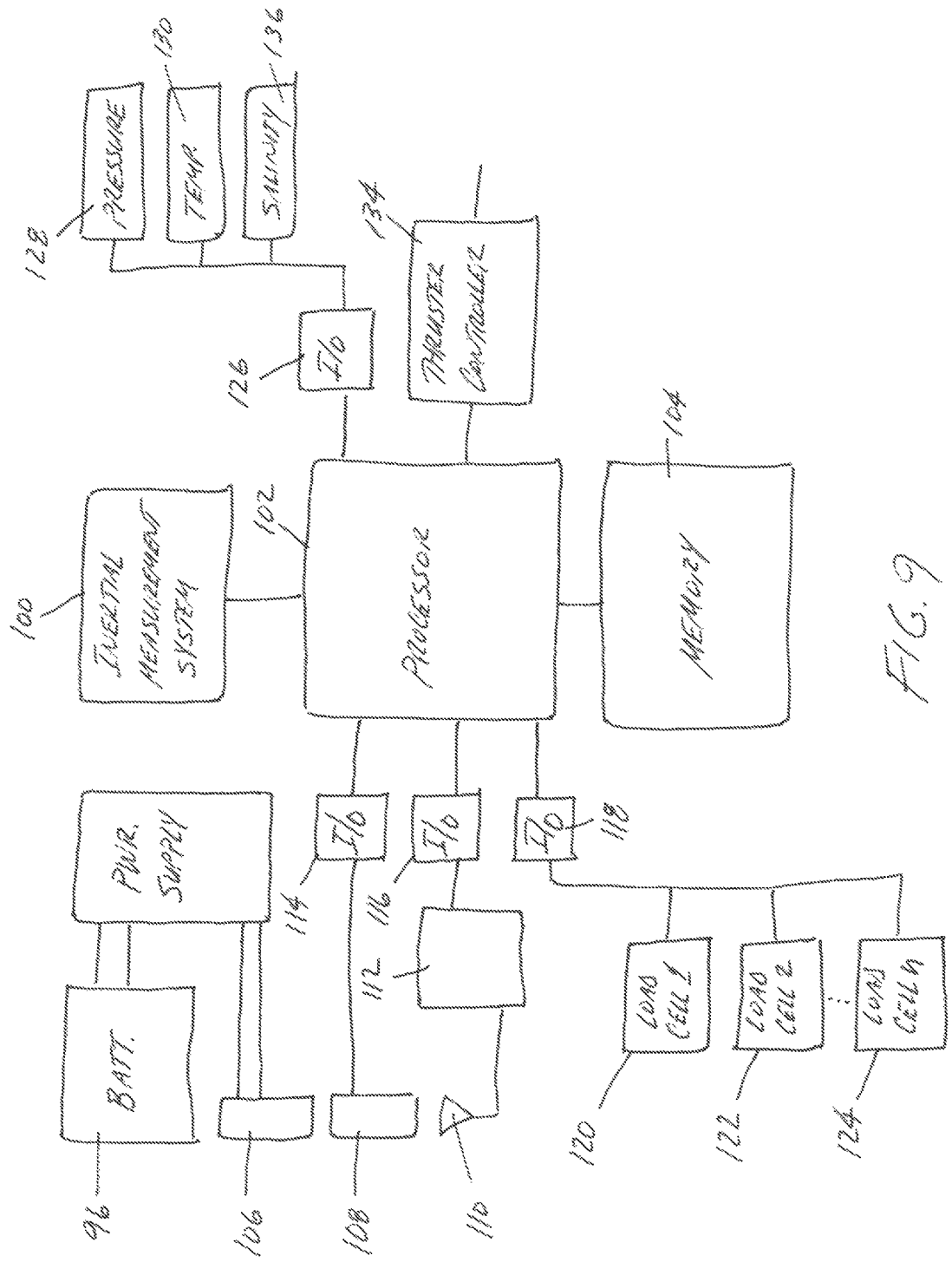
FIG. 9 is a schematic view, showing a representative instrumentation package for an inventive termination.

The instrument package(s) may include many types of electronic devices. FIG. 9 schematically depicts an exemplary embodiment to aid the reader's understanding. The reader should first bear in mind that some versions will include external power and/or communication connections, while others will not. The unconnected versions will run on internal power and may save information for subsequent downloading, or pulse information to other sources on an interval or as-needed basis (such as a strand integrity breach alarm signaling an acoustic transmitter to communicate to a ship-board receiver). The connected versions may transfer information up the cable (to a receiver on board a surface vessel) as they are being used. FIG. 9 shows an externally-connected version (meaning a version that is designed to maintain communication up the cable).

The instrument package(s) may include only analog devices. An example would be load cell circuitry that sends a sensed value up the cable. It is preferable in most cases, however, to include digital devices such as one or more processors. These may be used to convert information to a digital format and thereby facilitate easier retention and transmittal. The example of FIG. 9 uses digital circuitry.

Processor 102 is ideally a programmable device capable of running suitable software. It includes an associated memory 104. The memory is preferably non-volatile so that it may store data over time even if the power is lost. Power supply 98 provides stable power to all the components shown (The power connections are not depicted). The power supply may draw input power from battery 96, from external power connector 106, or both. Additionally it may draw power from an alternate source such as an ROV tether or auxiliary power source on the sea floor.

Inertial measurement system 100 ("IMS") provides position and orientation data to the processor. It preferably provides full six degree of freedom information. Using conventional nomenclature, this means that the IMS provides such information as X-axis position, Y-axis position, roll angle, pitch angle, and yaw angle. The IMS may also provide such information as a rate-of-change for these values. The information provided by the IMS allows the processor to "know" the termination's position and space and its orientation. This assumes, of course, that accurate initial information is provided (an initial value for all six state variables). Providing initial state information is well understood in the art. As one example, the termination might be placed in an initial "zeroing" fixture. After it is zeroed the cable to which the termination is connected would then be lifted by a boom on a crane and swung into service moving a payload.

The IMS is not limited to any particular kind of system. Such systems have traditionally used spinning gyroscopes in combination with linear accelerometers. However, since space will be somewhat limited inside the termination, solid state solutions are preferable. The preferred embodiments will likely employ "ring laser gyros." As those skilled in the art will know, these devices are not gyros at all. Rather, each individual ring laser measures interference between counter-propagating laser beams to sense angular velocity. Mathematical functions are used to convert the angular velocity to angular position.

Linear accelerometers (essentially very accurate force detectors) are used to measure linear acceleration. Three orthogonal ring laser assemblies are used and multiple linear accelerometers are used. The IMS generally contains its own internal processor and memory. These units integrate the received data to produce values for the six state variables. Alternatively, raw data may be fed from the IMS to the processor and the processor may perform the integrating functions.

The reader should bear in mind that not all inventive embodiments will include a full six degree of freedom IMS. As an example, some embodiments may provide only positional data without any attitude data. Others may provide attitude data with no reference to position. Still others may omit an IMS altogether.

Multiple input/output ports 114, 116, 118, 126 are provided for the processor. I/O port 114 provides connection to communication connector 108. In this example the communication connector provides a hard-wired connecting to the far end of the cable. If, for example, the cable is being paid off a shipboard crane, the far end of the cable will remain on the ship and the communication connector will allow real-time communication between the ship and the termination (even though the termination may be thousands of meters below the ocean's surface).

I/O port 116 connects processor 102 to acoustic transducer 110. The acoustic transducer is connected to acoustic antenna 110. This is a device intended for undersea communications. It allows sonar-like signals to be sent by the termination to other devices. The termination can also receive these signals from an external source. This type of communication device is merely an example, as it is one of many potential technologies that can be used to either transmit or receive information.

I/O port 118 connects the numerous load cells 120,122, 124 (feeding load data from the individual strands) to processor 102 (any type of load sensor may be substituted). I/O port 126 connects multiple sensors to the processor. In this example, it connects pressure sensor 128, temperature sensor 130, and salinity sensor 136. These are merely examples of the many forms of sensors that may be tied into the instrument package. These may reside within the housing or be separate. In some cases they may be entirely separate, such as those on the subsea infrastructure—and may simply communicate data to the instrument package.

Returning briefly to FIG. 8, the reader will note the numerous wire connections 92 to the core and to the load cells monitoring the strand loads. The processor is able to use these connections to monitor position and loading information and to send that data back to the far end of the cable through the electrical and/or optical connections in core 72. Of course if the termination is designed to be a standalone system without power and/or communication running down the cable, this data is simply stored for ship-side retrieval or transmitted on an as needed basis. Power in that case is handed via a sufficient local power source.

Figure 11:
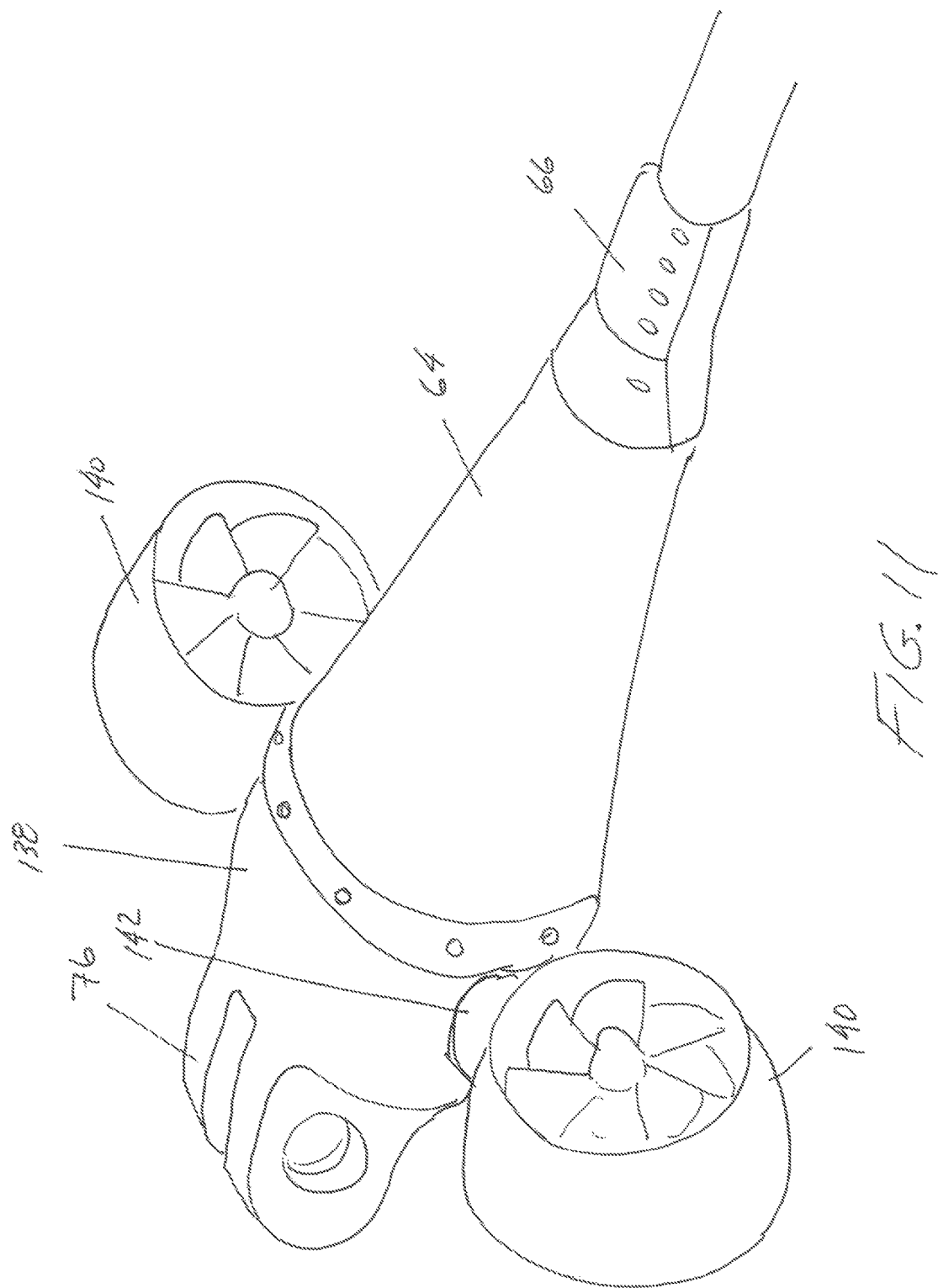
FIG. 11 is a perspective view, showing an inventive termination with thrusters.

In the version shown in FIG. 9 the integrated termination is configured for deep water lifting operations. The termination is provided with a pair of thrusters that can provide limited positioning adjustment—controlling both the twist in the cable as it moves down the water column, and the positioning of the payload as it nears its point of connection on the sea floor. Thruster controller 134 controls the orientation and thrust provided by the thrusters. The thruster controller is integrated with processor 102 as shown. FIG. 11 provides a perspective view of the completed termination with a series of thrusters 140 included. Each thruster may be independently pivoted about its trunnion mount 142. Each thruster may also be throttled and reversed in this embodiment. The orientation and affiliation of thrusters may vary widely, and may not necessarily be integral to the termination housing. For example these may be mounted to a large external frame. In other cases there may further be auxiliary thrusters or position orienting devices mounted to the actual payload.

Figure 13:
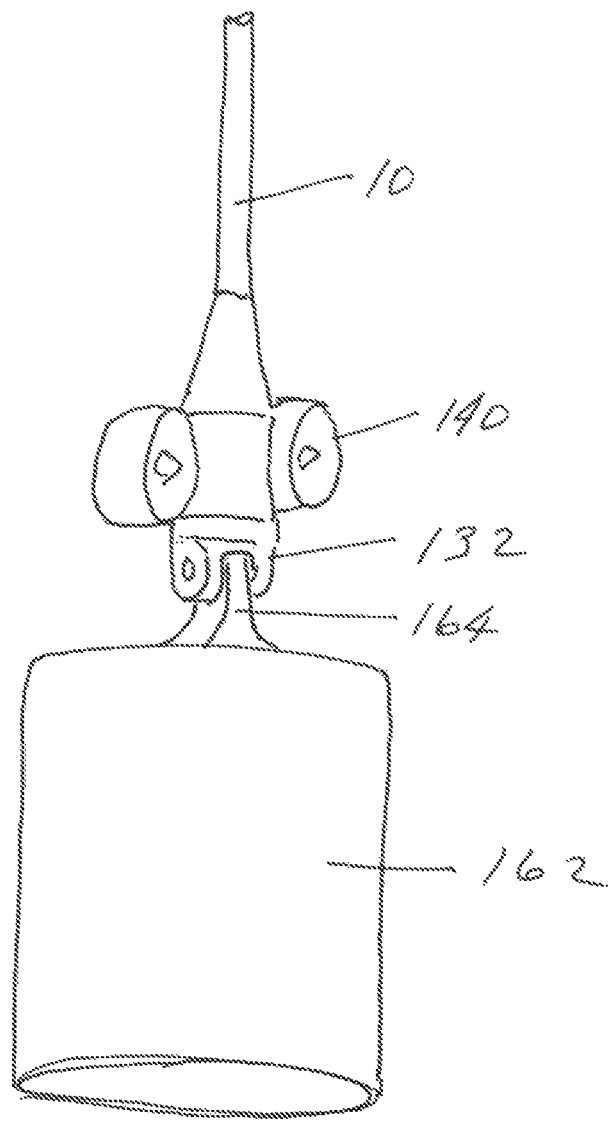
FIG. 13 is a perspective view, showing the use of the inventive termination to place a payload in the deep water lifting environment.

FIG. 13 shows a view of the termination 132 attached to a representative payload 162 in a deep water lifting scenario. Lifting tang 164 on the payload is connected to the clevis assembly by a cross-pin. Cable 10 suspends the assembly from a crane located on a surface vessel. Thrusters 140 provide selective lateral and torsional mobility on the sea floor, as well as assuring that the cable is not twisted when traveling to and from the vessel through the water column which has alternating currents. With synthetic fiber and hybrid ropes in particular, this is helpful in assuring that rope integrity remains intact.

Surface vessel crane control systems include stabilization functions that are generally referred to as "anti-heave" functions. These are designed to minimize wave-induced motion of the payload on the end of the cable. However, these anti-heave functions in the prior art have no useful information regarding the exact motion of the termination and its attached payload when at depth. Rather, they attempt to compensate using only information regarding the motion of the surface vessel. This is a challenge when running in deep water. It is especially significant with the use of synthetic fibers as the delayed spring response is more difficult to predict. In the present invention (for embodiments including real-time data transmission), the termination can transmit accurate motion and position information which can then be used by the surface anti-heave systems or an inline device.

Figure 10:
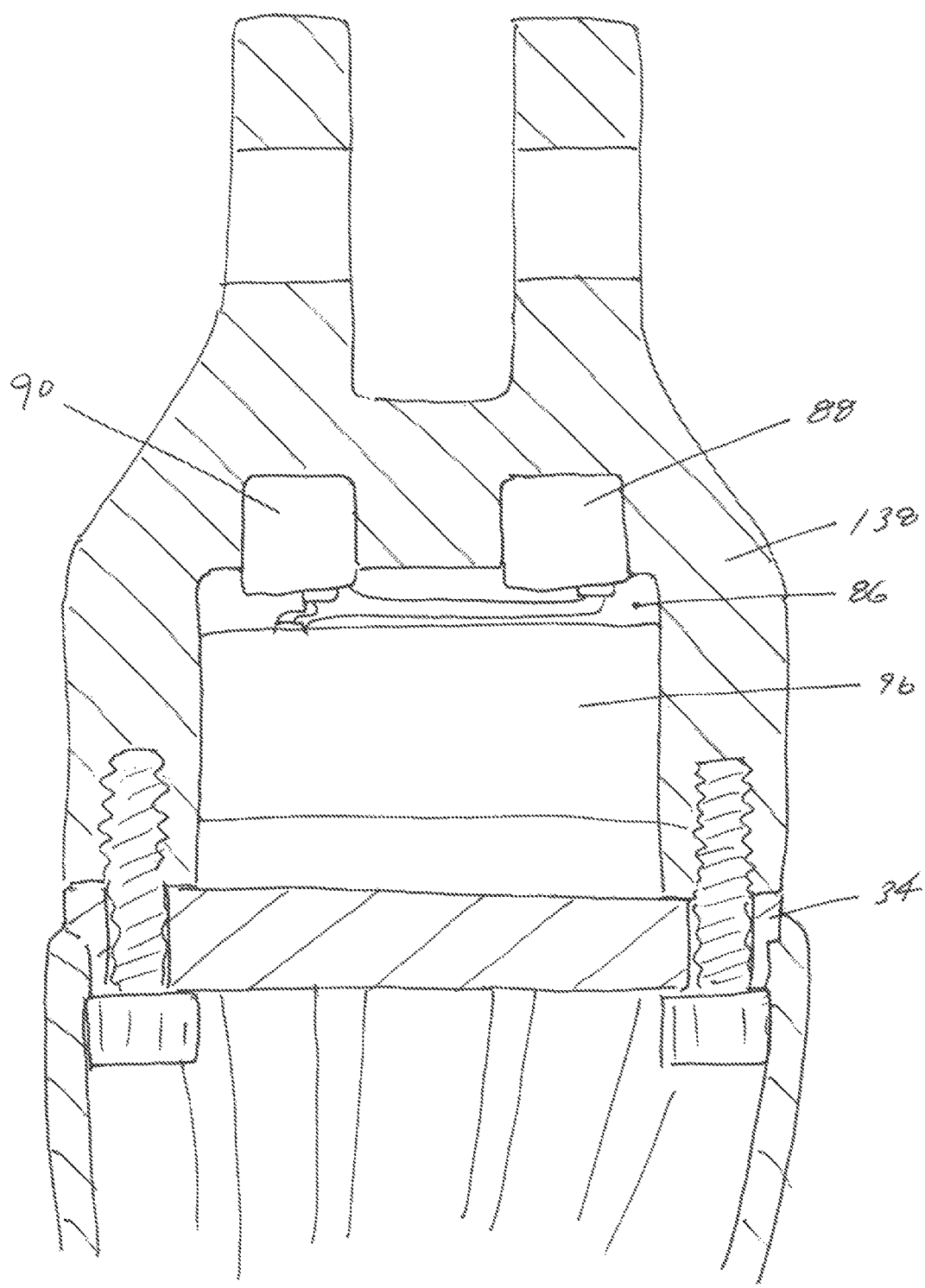
FIG. 10 is a sectional elevation view, showing another embodiment of the inventive termination.

FIG. 10 shows another embodiment in which there is no communication through the cable. Extended housing 138 includes a larger cavity 86. A large battery 96 is provided in this cavity. The battery provides electrical power to the instrument packages, the load cells, and other items requiring electrical power. In this version the instrument packages are more akin to the "black box" of an aircraft (a flight data recorder). An external port (not shown) is provided so that when the termination is brought in for service the battery can be recharged and the internally-stored data can be downloaded. Of course, non-wired options are also possible for the battery charging and data downloading (such as an inductive connection).

Figure 12:
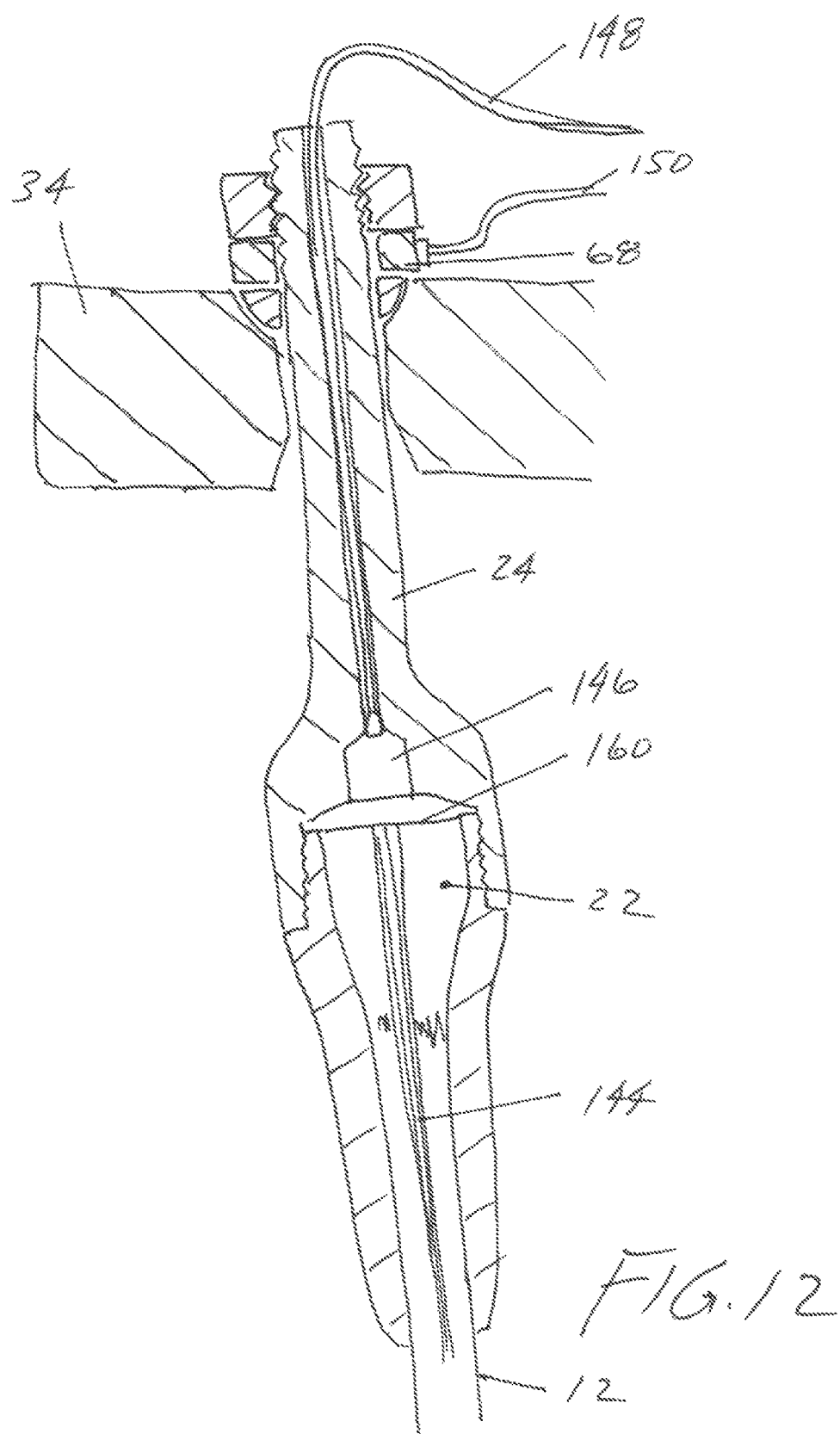
FIG. 12 is a sectional elevation view, showing a strand termination with an embedded sensing/comm element.

Other components may be provided to proactively monitor the state of the load strands (as opposed to inferring their state from the loads applied to them). FIG. 12 shows an embodiment in which strand 12 includes embedded sensing/communication elements 144. These elements are intended to be used in monitoring the condition of the cable (though they may possibly be used for communication as well). In the version shown, these elements are optical fibers that stretch from one end of the cable to the other. Light is applied to the far end of the cable. Sensor 146 measures the light transmitted and sensor lead 148 passes through the loading stud to carry this information to the processor (sensor lead 150 carries the load cell information). The optical fibers are sized to break as the strand is over-stressed. Alternately if a strand is damaged or cut in operation the ceased light would indicate a potential hazard. A reduction in light transmission thereby indicates a cable overstress. This example is one of many possible configurations. Fiber optics could run through a jacket, down the center of the rope, etc. Alternatively, the use of electrical conductors could carry a similar function—providing either strain or pass/fail criteria for damage to the cable. Importantly, in all cases the termination may aid in collecting or transmitting the relevant information to determine the health of the lifting cable. In the event of a sensed problem, it could further be used to communicate the hazard to the surface vessel and/or other subsea equipment.

Most damage, especially with synthetic fiber cables, would occur in the last few meters of the cable (as it reaches the termination). This is generally due to the fact that ROVs would be operating in this area. Thus, in some embodiments the sensing/comm elements 144 may only be included in this portion of the cable. One approach is to embed a 20 meter loop of conductive material and then monitor for breaks in this material (such as by monitoring for increased resistance).

Figure 14:
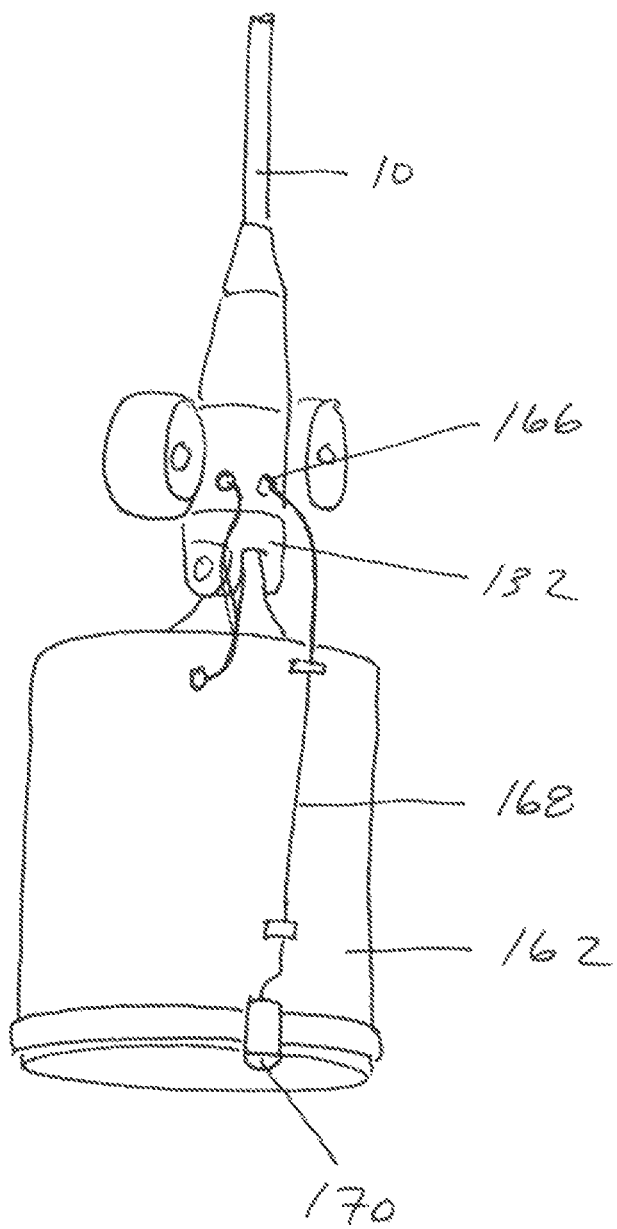
FIG. 14 is a perspective view, showing the addition of an external camera to the assembly of FIG. 13.

The sensors and other components provided within the intelligent cable termination need not be connected directly to the termination itself. FIG. 14 illustrates a placement scenario where downward visibility is needed from payload 162. Camera 170 is mounted on payload 162 in a position providing a good downward field of view. Cable 168 attaches to camera 172 and to connector 166 on intelligent cable termination 132. In this version, video data is fed into the instrument package(s) within the termination and then up cable 10 to a surface ship. The video data is used to guide the placement of the payload. The camera and cable may be left with the payload when the payload is released from intelligent cable termination 132. Connector 166 may facilitate this detachment (by being designed to reliably pull free upon the application of a specified detachment force).

Figure 15:
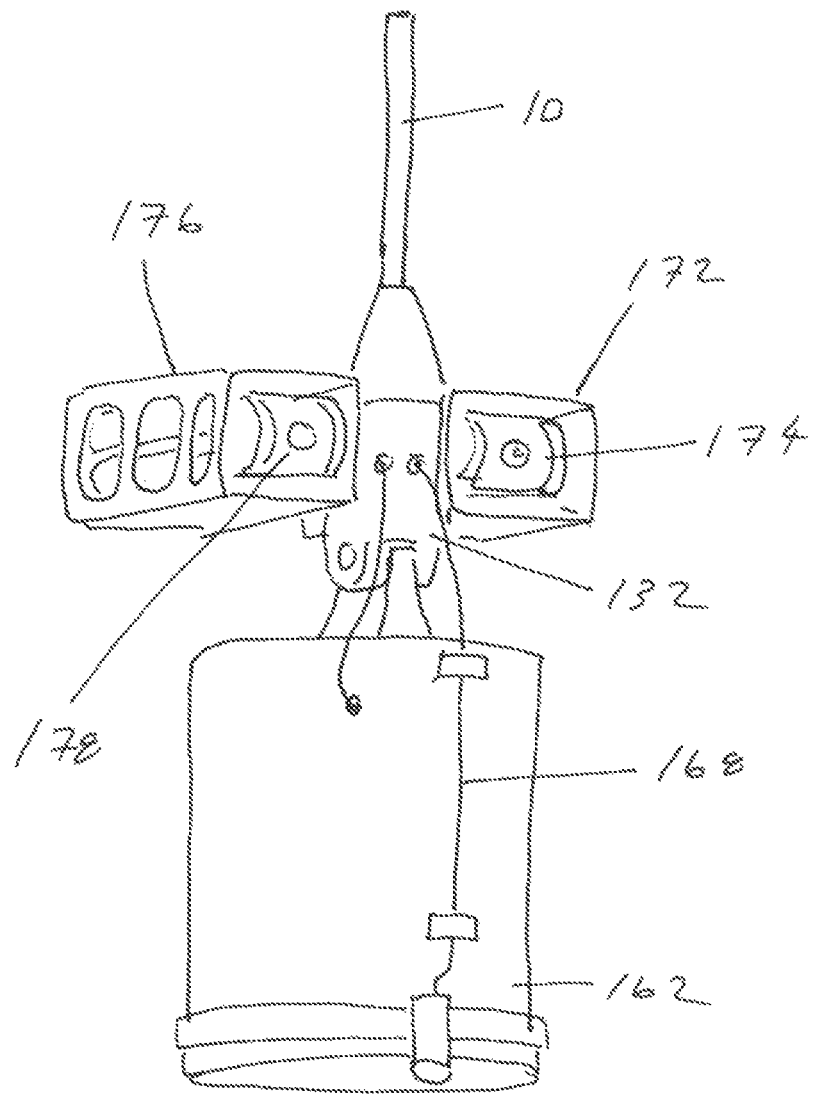
FIG. 15 is a perspective view, showing the addition of a pair of ROV garages and ROV's to the intelligent cable termination.
Figure 16:
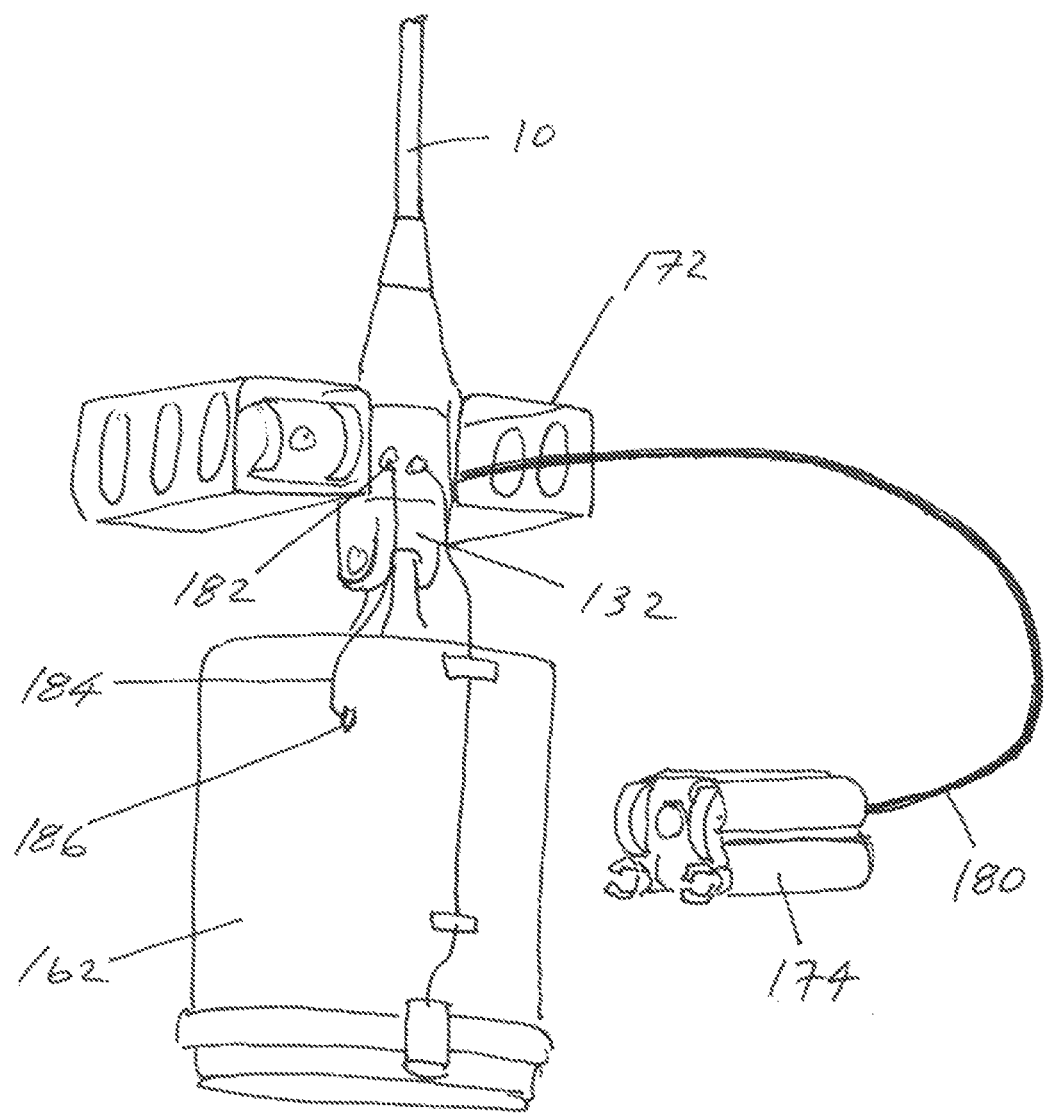
FIG. 16 is a perspective view, showing one of the ROV's of FIG. 15 in operation.

FIGS. 15 and 16 show still another embodiment in which ROV's (remotely operated vehicles) are used. It is common in undersea lifting operations to use ROV's to guide and place a payload. These ROV's are typically lowered and controlled using a cable other than the cable used for lifting the payload. Many ROV's are lowered into a working position in a protective "ROV garage." The ROV garage may contain a tether connected to the ROV. The tether often pays off a reel as needed. The tether may carry electrical power, bidirectional data signals, and air or fluid pressure. In recent years autonomous underwater vehicles ("AUV's") are replacing ROV's in some applications. In this disclosure, the term "ROV" shall be understood to encompass both ROV's and AUV's. An AUV does not usually have a tether but it may still be deployed from a garage and it is often charged in that garage.

FIG. 15 shows an embodiment in which two ROV garages 172, 176 are connected to intelligent cable termination 132. Each ROV garage contains an ROV 174, 178. Using this system, the ROV's are lowered with the payload. The ROV's may be used to manipulate the position and orientation of the payload, as well as operating other systems such as the mechanism that releases the payload from the cable. The ROV's may also provide video data so that a surface operator can see the state of the payload and its surroundings.

FIG. 16 shows the same assembly with ROV 174 having left its garage 172. ROV 174 may be maneuvered as needed. It contains multiple thrusters that allow it to orient itself in a desired direction and provide force in a desired direction. Information regarding the state of the ROV may be sent via tether 180 back to ROV garage 172. This information may then be fed into the instrument package(s) within intelligent cable termination 132 (and possibly back up cable 10).

It is also possible to establish communications directly between the payload and the intelligent cable termination. In the version of FIG. 16, electrical cable 184 connects connector 182 on the termination to connector 186 on the payload. If, for example, the payload contains a release mechanism, this connection may be used to instruct the payload to release itself from intelligent cable termination 132. Cable 184 would then detach itself as the intelligent cable termination is lifted away from the payload.

Figure 17:
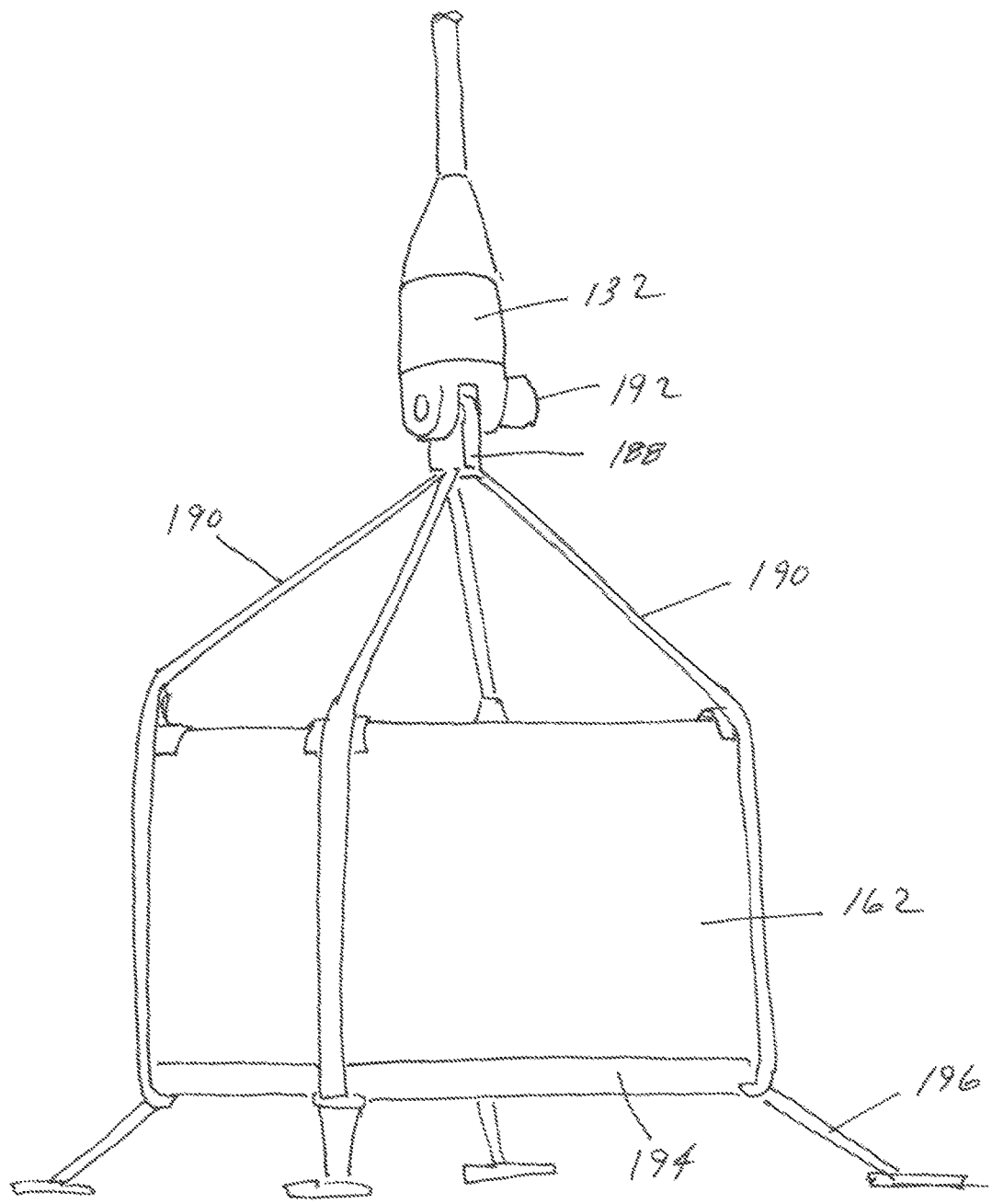
FIG. 17 is a perspective view, showing a different payload configuration.

FIG. 17 depicts a more common configuration for a payload. In this version payload 162 rests atop a standard pallet 194 with four legs 196. Rigging is used to appropriately suspend the load. In this case four slings 190 extend along the sides of the payload and down to the pallet. The four slings are joined to tang 188, which is connected to the intelligent cable termination. Release mechanism 192 is provided to selectively release tang 188.

When the assembly reaches its destination (such as the seabed), release mechanism 192 is actuated and the tang and slings fall free from the intelligent cable termination. The release mechanism may be actuated by an instrument package in the termination. Alternatively, it may be released by an ROV. The rigging may remain with the payload indefinitely. In the alternative, an ROV can be used to detach and retrieve the rigging.

For the embodiments in which information is transmitted from the intelligent cable termination up the cable, the reader should bear in mind that the extraction point for this information may be in different locations. The "payload end" of the cable is the end to which the termination is attached. A cable is often paid off a drum on a surface vessel. Information applied to the cable at the payload end must be extracted at some point distal to the payload end. This extraction point may simply be the opposite end of the cable. However, it may also be some intermediate point where the information carrying components of the cable depart the load carrying components.

One may make some generalizing statements regarding the invention that will be true for most embodiments:

1. It is advisable to place the instrument package(s) above the payload release point. An objective of the present invention is to use the instrument package many times in the deployment of multiple payloads, so it is undesirable to place the instrument package in a position where it is difficult to "bring home" with the termination when the payload is released. The payload release point may be in the vicinity of the intelligent cable termination (as shown in FIG. 17). However, it may also be far below the termination. In some instances the release mechanism may lie 20 meters below the termination. This will be true where long slings connect the termination to the payload and the release mechanism is located on the payload end of the long slings.

2. For the versions incorporating force sensing devices (load cells, strain gauges, etc.), the instrument package may transmit the sensed forces directly or record them for subsequent transmission.

3. The preferred embodiments will all include a processor and the ability to transmit digital signals. However, it is possible to implement the invention using only analog components and no processor. As an example, a very simple version might include only load cells, a local battery, and possibly an amplifier set in the integrated termination. These analog devices could then send analog signals directly up the cable and all the processing would be done outside of the integrated termination.

4. The instrument package ideally includes an inertial measurement system. Such a system, combined with real-time (or near real-time) data transmission back to the surface, allows a surface operator to know the precise location and orientation of the integrated termination (and by inference the payload itself).

5. The use of synthetic filaments in the cable provides a large weight saving in comparison to prior art steel cables. This weight savings allows additional weight to be carried at the termination (or in the vicinity thereof). Batteries may be added to the intelligent termination to provide an ample power source without having to send power down the cable. Data may still be send through the cable in this scenario, but the greater challenge of sending power through the cable would be avoided.

6. The camera such as shown in FIG. 14 may be a stereo camera, a laser scanner, or some other suitable device capable of allowing the intelligent termination to "home" on a target. As an example, a visual fiducial might be provided as the desired placement point on an undersea platform. A stereo camera could be used to guide the payload onto this target. A 3D object could be used as a target for a laser scanner. The camera could also be provided on the intelligent termination itself (perhaps offset on a lateral boom).

7. If a visual guidance system is provided then the inertial measurement system does not have to be terribly accurate. The inertial system may be used to get the payload "in the ballpark" and the visual guidance system could then take over for the final placement. The combination of the two systems allows for greater accuracy while holding down costs.

Many other features can be included with the inventive termination, including one or more of the following:

1. The memory may be used to log strand loads for future analysis regarding needed cable maintenance and possible removal from service.

2. Communication and power wires may not travel through the core of the cable but rather may travel externally. As an example, they might be embedded in the cable's jacket or wrapped helically around the cable.

3. The collector and housing could be made as one integral unit.

4. The instrument package functionality can be applied to a cable having only a single strand (rather than a multi-stranded cable incorporating a collector).

5. The instrument package may be included as part of a ruggedized ROV garage.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

The invention claimed is:

1. An integrated termination package for deep water marine operations, comprising:
    a. a cable including synthetic fibers, wherein a majority of a tensile load placed on said cable is carried by said synthetic fibers;
    b. said cable including a payload end and an extraction point distal to said payload end;
    c. an intelligent cable termination connected to said payload end of said cable, said intelligent cable termination including a payload connecting feature;
    d. said intelligent cable termination including a housing configured to transmit said tensile load placed on said cable to said payload connecting feature;
    e. an instrument package contained within said housing, said instrument package including a processor; and
    f. a communication link contained within said instrument package, wherein said communication link is configured to transmit information from said processor.

2. An integrated termination package as recited in claim 1, wherein:
    a. said instrument package includes a measurement system configured to determine a position and orientation of said intelligent cable termination; and
    b. said communication link is configured to transmit said position and orientation of said intelligent cable termination.

3. An integrated termination package as recited in claim 2, wherein said communication link comprises an electrical connection through said cable to said extraction point.

4. An integrated termination package as recited in claim 2, wherein said instrument package includes a ring laser assembly.

5. An integrated termination package as recited in claim 1, wherein said communication link comprises an electrical connection through said cable to said extraction point.

6. An integrated termination package as recited in claim 1, wherein said instrument package includes a load sensor configured to sense a load on said cable.

7. An integrated termination package as recited in claim 6, wherein said instrument package further comprises a memory configured to store information.

8. An integrated termination package as recited in claim 7, wherein said integrated termination further comprises a battery supplying power to said instrument package.

9. An integrated termination package as recited in claim 1, wherein:
    a. said cable includes a plurality of strands, with each of said strands being connected to said integrated termination; and
    b. said instrument package includes a load sensor for each of said strands, with each of said load sensors being configured to measure a load on said strand.

10. An integrated termination package as recited in claim 9, wherein said instrument package further comprises a memory configured to store information from each of said load sensors.

11. An integrated termination package for deep water marine operations, comprising:
    a. a cable including a payload end and an extraction point distal to said payload end;
    b. an intelligent cable termination connected to said payload end of said cable, said intelligent cable termination including a payload connecting feature;
    c. said intelligent cable termination including an instrument package, said instrument package including a processor;
    d. a communication link contained within said instrument package, wherein said communication link is configured to transmit information from said processor;
    e. said intelligentcable termination including a housing configured to transmit a tensile load placed on said cable to said payload connecting feature;
    f. said instrument package contained within said housing.

12. An integrated termination package as recited in claim 11, wherein:
    a. said instrument package is configured to determine a position and an orientation of said intelligent cable termination; and
    b. said communication link is configured to transmit said position and said orientation of said intelligent cable termination to said extraction point on said cable.

13. An integrated termination package as recited in claim 12, wherein said communication link comprises an electrical connection through said cable to said extraction point.

14. An integrated termination package as recited in claim 12, wherein said instrument package includes a ring laser assembly.

15. An integrated termination package as recited in claim 11, wherein said communication link comprises an electrical connection through said cable to said extraction point.

16. An integrated termination package as recited in claim 11, wherein said instrument package includes a load sensor configured to sense a load on said cable.

17. An integrated termination package as recited in claim 16, wherein said instrument package further comprises a memory configured to store information from said load sensor.

18. An integrated termination package as recited in claim 17, wherein said integrated termination further comprises a battery supplying power to said instrument package.

19. An integrated termination package as recited in claim 11, wherein:
    a. said cable includes a plurality of strands, with each of said strands being connected to said integrated termination; and
    b. said instrument package includes a load sensor for each of said strands, with each of said load sensors being configured to measure a load on said strand.

20. An integrated termination package as recited in claim 19, wherein said instrument package further comprises a memory configured to store information from each of said load sensors.

* * * * *